US012089020B2

(12) United States Patent
Nakayama

(10) Patent No.: US 12,089,020 B2
(45) Date of Patent: Sep. 10, 2024

(54) HEADPHONE, AND VOLUME ADJUSTMENT METHOD THEREOF

(71) Applicant: Roland Corporation, Shizuoka (JP)

(72) Inventor: Masayuki Nakayama, Shizuoka (JP)

(73) Assignee: Roland Corporation, Shizuoka (JP)

(*) Notice: Subject to any disclaimer, the term of this patent is extended or adjusted under 35 U.S.C. 154(b) by 189 days.

(21) Appl. No.: 17/886,414

(22) Filed: Aug. 11, 2022

(65) Prior Publication Data

US 2023/0209264 A1 Jun. 29, 2023

(30) Foreign Application Priority Data

Dec. 28, 2021 (JP) ................................ 2021-215238

(51) Int. Cl.
*H04R 5/033* (2006.01)
*H04R 1/10* (2006.01)

(52) U.S. Cl.
CPC ........... *H04R 5/033* (2013.01); *H04R 1/1041* (2013.01); *H04R 2430/01* (2013.01)

(58) Field of Classification Search
CPC .... H04R 2420/07; H04R 5/04; H04R 1/1041; H04R 3/00; H04R 5/033; H04R 3/12; H04R 2420/05; H04R 1/105; H04R 2420/03
USPC ........ 381/74, 120, 123, 309, 94.5, 104, 384, 381/28, 109, 106
See application file for complete search history.

(56) References Cited

U.S. PATENT DOCUMENTS 8,620,007 B2 12/2013 Lee et al.
8,699,963 B2 * 4/2014 Chen .................. H04M 1/6016 381/11
2008/0166002 A1 * 7/2008 Amsel .................... H04R 1/026 381/370
2009/0041267 A1 * 2/2009 Lee .......................... H03G 3/02 381/104
2020/0413170 A1 * 12/2020 Liu .......................... H04R 1/02

FOREIGN PATENT DOCUMENTS

JP 2009-290474 * 12/2009

* cited by examiner

*Primary Examiner* — Norman Yu
(74) *Attorney, Agent, or Firm* — JCIPRNET

(57) ABSTRACT

A headphone includes: a first switch, switched off while at least one of left and right speakers faces inward, and switched on while both speakers face a predetermined direction; left and right amplifiers, amplifying input left and right audio signals and connecting them to the speakers; a second switch, selecting, as a path of the left and right audio signals, either a first path passing through an amplifier or a second path passing through an amplifier and being amplified with an amplification factor smaller than that of the first path; and a volume adjuster, decreasing volume of the left and right audio signals input to the left and right amplifiers in a first state in which the first path is selected and the first switch is off to be less than the volume in a second state in which the first path is selected and the first switch is on.

17 Claims, 7 Drawing Sheets

HEADPHONE, AND VOLUME ADJUSTMENT METHOD THEREOF

CROSS-REFERENCE TO RELATED APPLICATIONS

This application claims the priority benefit of Japan Application No. 2021-215238, filed on Dec. 28, 2021. The entirety of the above-mentioned patent application is hereby incorporated by reference herein and made a part of this specification.

BACKGROUND

Technical Field

The disclosure relates to a headphone and a volume adjustment method thereof.

Related Art

Conventionally, there is a headphone that has a hinge for rotating an ear cup of the headphone and is transformable from the headphone form to a speaker form (for example, see U.S. Pat. No. 8,620,007).

SUMMARY

According to one aspect of the disclosure, a headphone is provided including: left and right speakers, connected by a connection part; a first switch, switched off in a first form in which at least one of the left and right speakers is directed in an inward direction, and switched on in a second form in which both the left and right speakers are directed in a predetermined direction other than the inward direction; left and right amplifiers, amplifying left and right audio signals input thereto and connecting the left and right audio signals respectively to the left and right speakers; a second switch, selecting one of a first path and a second path as a path of the left and right audio signals, the first path passing through the left and right amplifiers, the second path passing through the left and right amplifiers and being amplified with an amplification factor smaller than that of the first path; and a volume adjuster, decreasing volume of the left and right audio signals input to the left and right amplifiers in a first state in which the first path is selected by the second switch and the first switch is off to be less than the volume of the left and right audio signals input to the left and right amplifiers in a second state in which the first path is selected and the first switch is on.

According to another aspect of the disclosure, a volume adjustment method of a headphone is provided. The headphone includes left and right speakers connected by a connection part, and left and right amplifiers amplifying left and right audio signals input thereto and connecting the left and right audio signals respectively to the left and right speakers. The volume adjustment method includes the following. It is determined whether a first state is reached in which a first switch is off and a first path passing through the left and right amplifiers is selected by a second switch. The first switch is switched off in a first form in which at least one of the left and right speakers is directed in an inward direction, and is switched on in a second form in which both the left and right speakers are directed in a predetermined direction other than the inward direction. The second switch selects one of the first path and a second path passing through the left and right amplifiers and being amplified with an amplification factor smaller than that of the first path as a path of the left and right audio signals. Volume of the left and right audio signals input to the left and right amplifiers in the first state is decreased to be less than the volume of the left and right audio signals input to the left and right amplifiers in a second state in which the first path is selected and the first switch is on.

DESCRIPTION OF THE EMBODIMENTS

The disclosure provides a headphone in which the volume of an audio signal can be suitably adjusted according to transformation between the headphone form and a speaker form, and a volume adjustment method thereof.

Hereinafter, a headphone and a volume adjusting method thereof according to an embodiment of the disclosure will be described with reference to the drawings. The configuration of the embodiment is an example and may be changed as appropriate without departing from the scope of the disclosure.

Figure 1A:
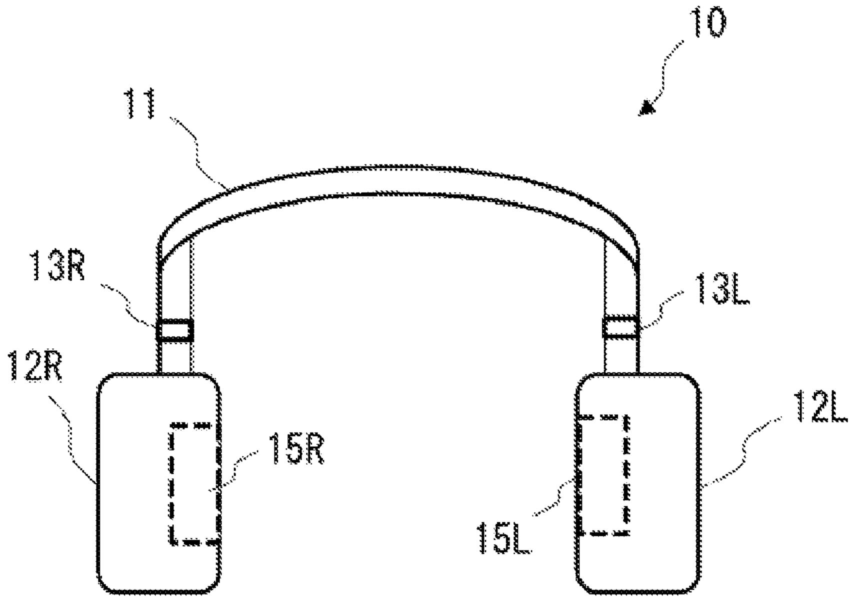
FIG. 1A and FIG. 1B schematically illustrate an appearance configuration of a headphone according to an embodiment.
Figure 1B:
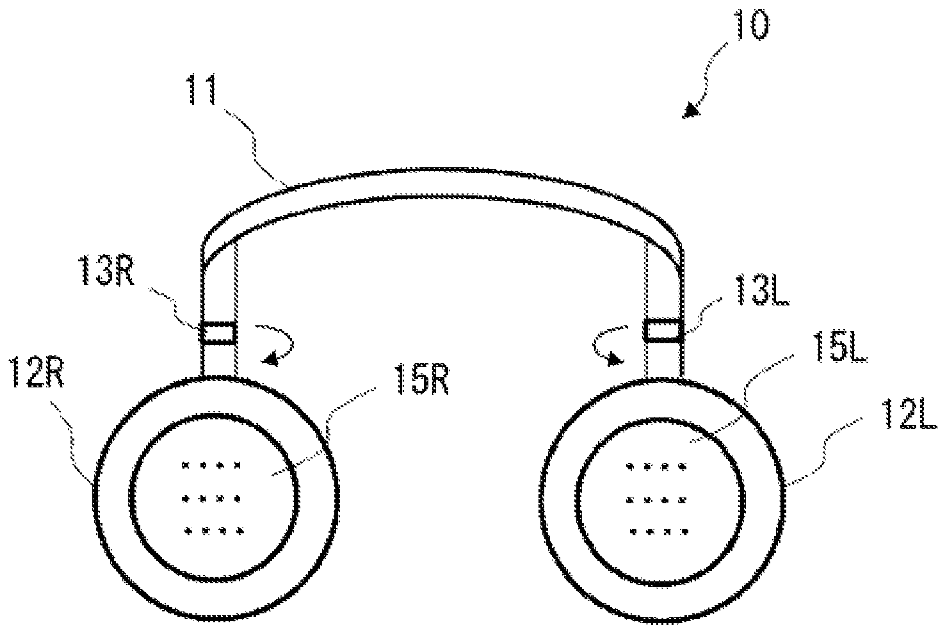

FIG. 1A and FIG. 1B schematically illustrate an appearance configuration of a headphone according to an embodiment. FIG. 1A illustrates a front view of a headphone 10. The headphone 10 includes left and right ear cups 12L and 12R that include the ear cup 12L for the left ear and the ear cup 12R for the right ear. The ear cup 12L on the left includes a speaker 15L for the left channel, and the ear cup 12R on the right includes a speaker 15R for the right channel.

The left and right ear cups 12L and 12R (speakers 15L and 15R) are connected by a connection part 11. The connection part 11 is used as a headband. The connection part 11 includes a hinge 13L and a hinge 13R. The hinges 13L and 13R are used to rotate the speakers 15L and 15R respectively provided in the left and right ear cups 12L and 12R.

The headphone 10 is transformable into a form (headphone form) of being used as a headphone and a form (speaker form) of being used as a speaker. The transformation is performed by rotating the left and right ear cups 12L and 12R using the left and right hinges 13L and 13R. In the headphone form, the left and right ear cups 12L and 12R are in a state (first form) with the speaker 15L and the speaker 15R directed inward and facing each other. In contrast, in the speaker form, the left and right ear cups 12L and 12R are in a state (second form) of being rotated about 90° so that the speaker 15L and the speaker 15R face the front (an example of a predetermined direction). In this way, the speakers 15L and 15R provided in the ear cups 12L and 12R are able to be rotated about 90° by the hinges 13L and 13R.

Figure 2:
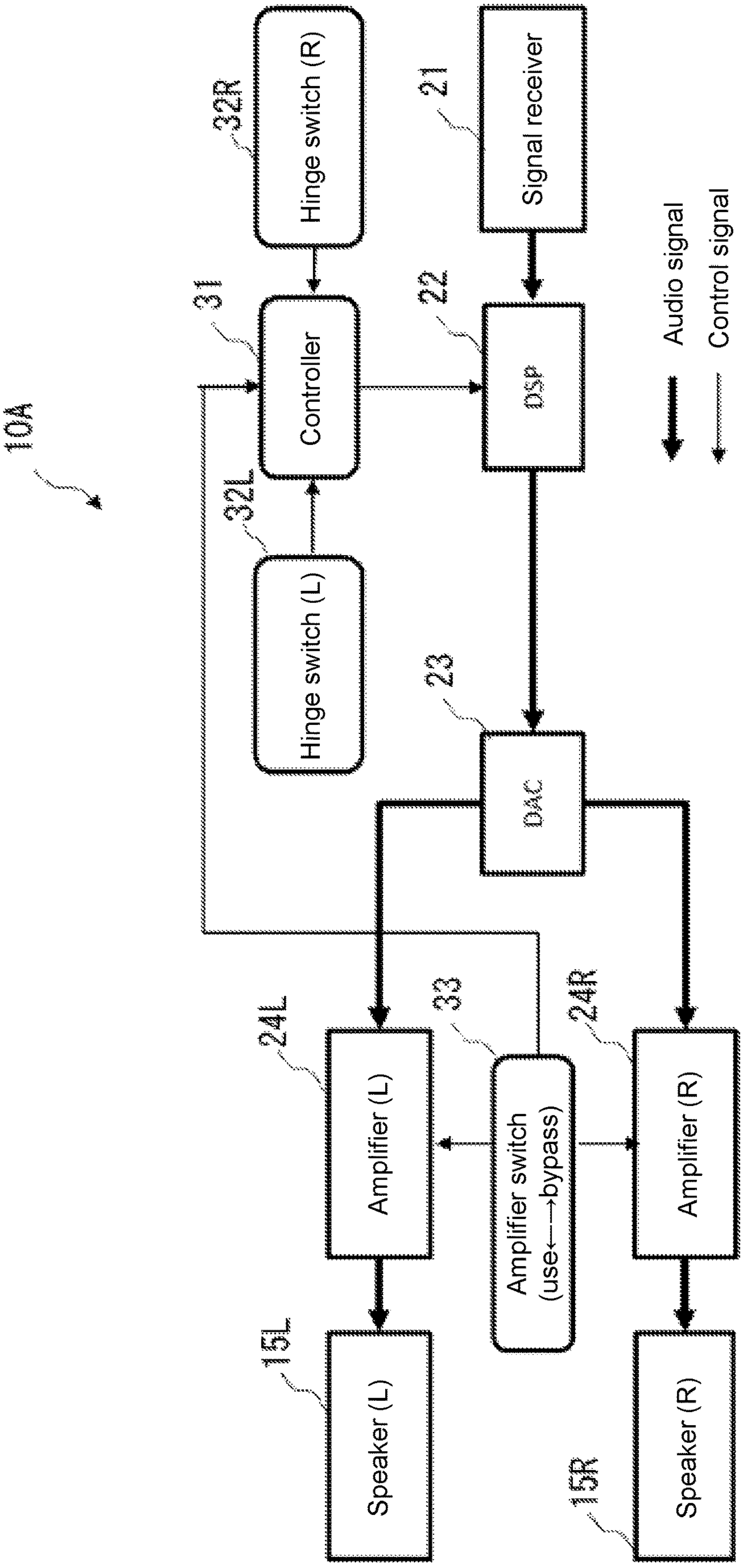
FIG. 2 illustrates a circuit configuration of a headphone.

FIG. 2 shows a configuration example of a headphone circuit 10A. The headphone circuit 10A is built in the headphone 10. The headphone circuit 10A includes a signal receiver 21, a digital signal processor (DSP) 22, a digital analog converter (DAC) 23, an amplifier 24L on the left side, an amplifier 24R on the right side, and the left and right speakers 15L and 15R. Further, the headphone circuit 10A includes a controller 31, a hinge switch 32L on the left side, a hinge switch 32R on the right side, and an amplifier switch 33. The hinge switches 32L and 32R are examples of a first switch, and the amplifier switch 33 is an example of a second switch.

The signal receiver is a receiving part of an audio signal input from the outside of the headphone 10. The receiving part may receive the audio signal by wireless communication such as Bluetooth® or by wire.

By executing a program, the DSP 22 is able to perform various audio processing on an audio signal input from the signal receiver 21. By processing the audio signal, audio processing such as volume adjustment, sound quality change and timbre adjustment can be performed. The DSP 22 outputs a digital audio signal for the left channel and a digital audio signal for the right channel.

The DAC 23 converts the left and right digital audio signals output from the DSP 22 into analog signals. Between the DAC 23 and the speaker 15L, a first path passing through the amplifier 24L and a second path bypassing the amplifier 24L are provided. Between the DAC 23 and the speaker 15R, a first path passing through the amplifier 24R and a second path bypassing the amplifier 24R are provided.

Each of the amplifier 24L and the amplifier 24R is a power amplifier that amplifies an input audio signal. Each of the speakers 15L and 15R emits a sound corresponding to an input audio signal.

The amplifier switch 33 selects one of the first path and the second path mentioned above as a path of the left and right audio signals output from the DAC 23. In a state (state of using an amplifier) in which the amplifier switch 33 has selected the first path, the audio signals amplified by the left and right amplifiers 24L and 24R are connected to the left and right speakers 15L and 15R.

In contrast, in a state (state of bypassing an amplifier) in which the amplifier switch 33 has selected the second path, the audio signals output from the DAC 23 bypass the left and right amplifiers 24L and 24R, and are directly connected to the left and right speakers 15L and 15R.

The amplifier switch 33 can be configured using a relay or a semiconductor switch. A state of the amplifier switch 33 can be manually switched. The amplifier switch 33 inputs a signal indicating its own state (path selection state, that is, the state of using or bypassing an amplifier) to the controller 31. For example, the controller 31 is able to detect a voltage or the like according to the state of the amplifier switch 33.

The first path passes through the left and right amplifiers 24L and 24R, and the second path bypasses the left and right amplifiers 24L and 24R. However, here, as another example, the second path may pass through the left and right amplifiers 24L and 24R, and an amplification factor of the amplifiers 24L and 24R for the second path may be made smaller than that for the first path. In this case, the amplifier switch 33 selects one of the first path having a large amplification factor and the second path having a small amplification factor.

The hinge switch 32L is provided in the hinge 13L, and the hinge switch 32R is provided in the hinge 13R. The hinge switches 32L and 32R are switched on in the case where a rotation angle of each of the hinges 13L and 13R relative to the connection part 11 becomes an angle in the speaker form, and are switched off in the case where the rotation angle becomes an angle in the headphone form and during a transition from the headphone form to the speaker form. The hinge switches 32L and 32R can be configured using, for example, a Hall element and a permanent magnet. In view of the fact that both the hinge switches 32L and 32R are on, the controller 31 in the present embodiment determines that the speakers 15L and 15R are in the state (second form) of facing the predetermined direction (front). On the other hand, in view of the fact that at least one of the hinge switches 32L and 32R is off, the controller 31 determines that the speakers 15L and 15R are in the state (first form) of facing each other.

The controller 31 receives the signal indicating the state of the amplifier switch 33 and a signal indicating on/off of the hinge switches 32L and 32R, and controls operation of the DSP 22. The controller 31 is composed of a general-purpose or dedicated integrated circuit such as a field programmable gate array (FPGA) or an application specific integrated circuit (ASIC), or a combination of a processor (such as a central processing unit (CPU)) and a memory.

Figure 3:
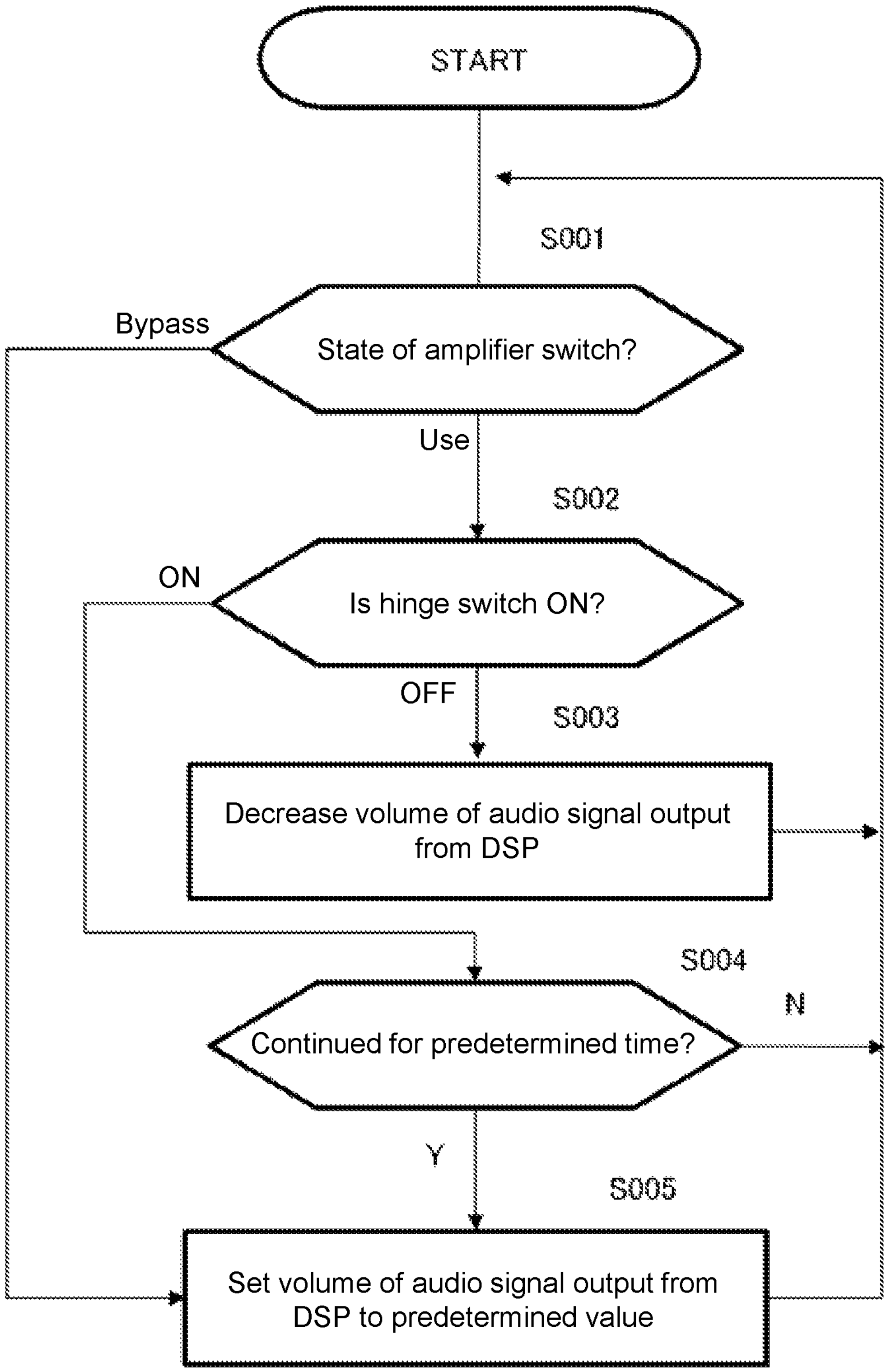
FIG. 3 is a flowchart showing Processing Example 1 of a controller.

FIG. 3 is a flowchart showing Processing Example 1 of the controller 31. In step S001, the controller 31 determines a state of the amplifier switch 33. If it is determined that the state of the amplifier switch 33 indicates that the amplifiers 24L and 24R are used (the first path is selected), the processing proceeds to step S002. If it is determined that the state of the amplifier switch 33 indicates that the amplifiers 24L and 24R are bypassed (the second path is selected), the processing proceeds to step S005.

In step S002, the controller 31 determines whether both the hinge switches 32L and 32R are on. If it is determined that both the hinge switches 32L and 32R are on, the processing proceeds to step S004; if not (if at least one of the hinge switches 32L and 32R is off), the processing proceeds to step S003.

In step S003, the controller 31 instructs the DSP 22 to decrease the volume of an audio signal output from the DSP 22 (and input to the amplifiers 24L and 24R) by a predetermined amount (for example, 10 dB). Upon instruction, the DSP 22 operates as a volume adjuster and decreases the volume for the audio signal. At this time, in the case where the volume of the audio signal is increased by 10 dB due to amplification of the audio signal by the amplifiers 24L and 24R, the DSP 22 decreases the volume of the audio signal input to the amplifiers 24L and 24R by 10 dB so as to cancel out the amount of increase in the volume by the amplifiers 24L and 24R. After that, the processing returns to step S001.

In step S004, the controller 31 determines whether both the hinge switches 32L and 32R have been on for a predetermined time or longer. The length of the predetermined time may be set as appropriate, and is set to, for example, several tens of milliseconds. If it is determined that the ON time has continued for the predetermined time or longer, the processing proceeds to step S005; if not, the processing returns to step S001.

In step S005, the controller 31 instructs the DSP 22 to set the volume of the audio signal output from the DSP 22 to a predetermined value. The predetermined value is a value greater than the value obtained by the decrease in step S003. Accordingly, if the current volume is at the predetermined value, the DSP 22 (volume adjuster) that has received the instruction maintains that value (does nothing). In contrast, if the current volume is less than the predetermined value, the volume of the audio signal is increased. After that, the processing returns to step S001. The order of steps S001 and S002 may be reversed, and step S003 may be optional.

In this way, according to the processing shown in FIG. 3, in the headphone 10, the volume of the audio signal output from the DSP 22 and input to the amplifiers 24L and 24R in the first state in which the amplifier switch 33 is in the state (state in which the first path is selected) of using the amplifiers 24L and 24R and the hinge switches 32L and 32R are off is adjusted to a value less than the volume in the second state in which the amplifier switch 33 is in the state of using the amplifiers 24L and 24R and the hinge switches 32L and 32R are on. Accordingly, even when the amplifiers 24L and 24R are used, if the hinge switches 32L and 32R are off, it can be avoided that loud sound for the speaker form is emitted from the speakers 15L and 15R. After that, if the state in which both the hinge switches 32L and 32R are on continues for the predetermined time, the volume is increased to the predetermined value by the audio signal processing in the DSP 22 that sets the volume to the predetermined value. Since the audio adjustment in the DSP 22 is processing for a digital signal, mixing of noise or the like can be reduced as compared with adjustment of an analog signal.

If the amplifier switch 33 is in the state (state in which the second path is selected) of bypassing the amplifiers 24L and 24R, since the volume of the audio signal output from the DSP 22 is fixed at the predetermined value, the volume is not decreased by the DSP 22 regardless of the state of the hinge switches 32L and 32R.

Here, in the case where the second path passes through the left and right amplifiers 24L and 24R and the amplification factor of the amplifiers 24L and 24R is smaller than that for the first path, in step S001, if the controller 31 determines that the state of the amplifier switch 33 indicates that the first path is selected (the amplification factor is large), the processing proceeds to step S002. If it is determined that the state of the amplifier switch 33 indicates that the second path is selected (the amplification factor is small), the processing proceeds to step S005.

Figure 4A:
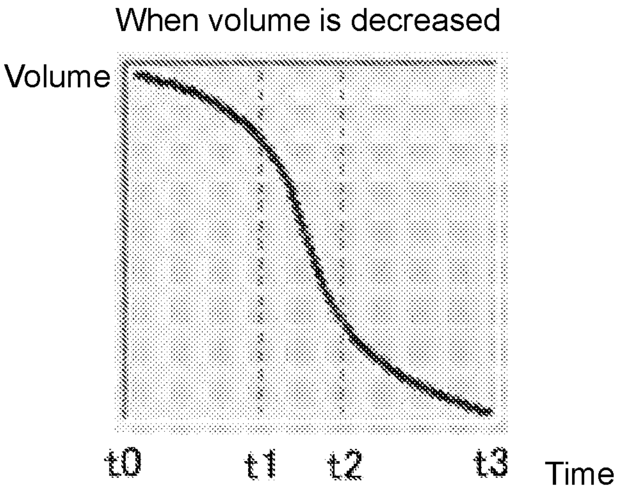
FIG. 4A is an explanatory diagram of volume decrease.
Figure 4B:
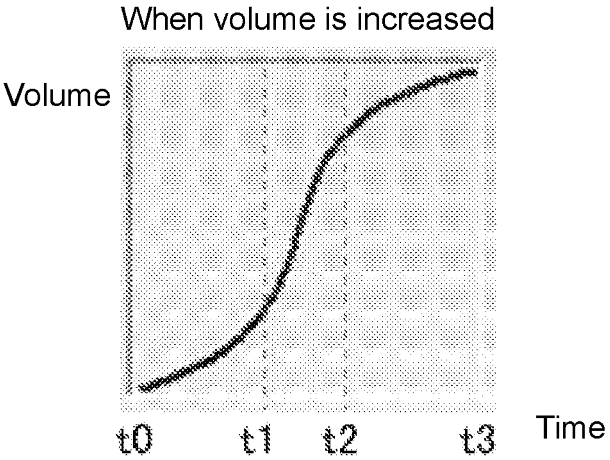
FIG. 4B is an explanatory diagram of volume increase.

FIG. 4A is an explanatory diagram of an example of decreasing the volume by a predetermined amount in step S003, and FIG. 4B is an explanatory diagram of increasing the volume by a predetermined amount in step S005. A change in volume due to a decrease may be a change in which the volume drops vertically, or a change in which the volume decreases by a certain amount of decrease. However, it is preferable to change the volume as shown in FIG. 4A in terms of smooth (friendly to a user's ear) volume change. That is, in the case where a start time of volume change is t0 and an ending time thereof is t3, the volume is decreased with a first slope during a period from time to to time t1. During a period from a first time t1 to a subsequent second time t2, the volume is decreased with a second slope greater than the first slope. Then, during a period from the second time t2 to the ending time t3, the volume is decreased with a third slope smaller than the second slope. The first slope and the third slope may be the same or different.

A change in volume due to an increase may be a change in which the volume rises vertically, or a change in which the volume increases by a certain amount of increase. However, it is preferable to increase the volume as shown in FIG. 4B in terms of smooth volume control. That is, in the case where the start time of volume change is t0 and the ending time thereof is t3, the volume is increased with the first slope during the period from time to to time t1. During the period from the first time t1 to the subsequent second time t2, the volume is increased with the second slope greater than the first slope. Then, during the period from the second time t2 to the ending time t3, the volume is increased with the third slope smaller than the second slope. The first slope and the third slope may be the same or different. The control of volume change as shown in FIG. 4A and FIG. 4B is optional.

Figure 5:
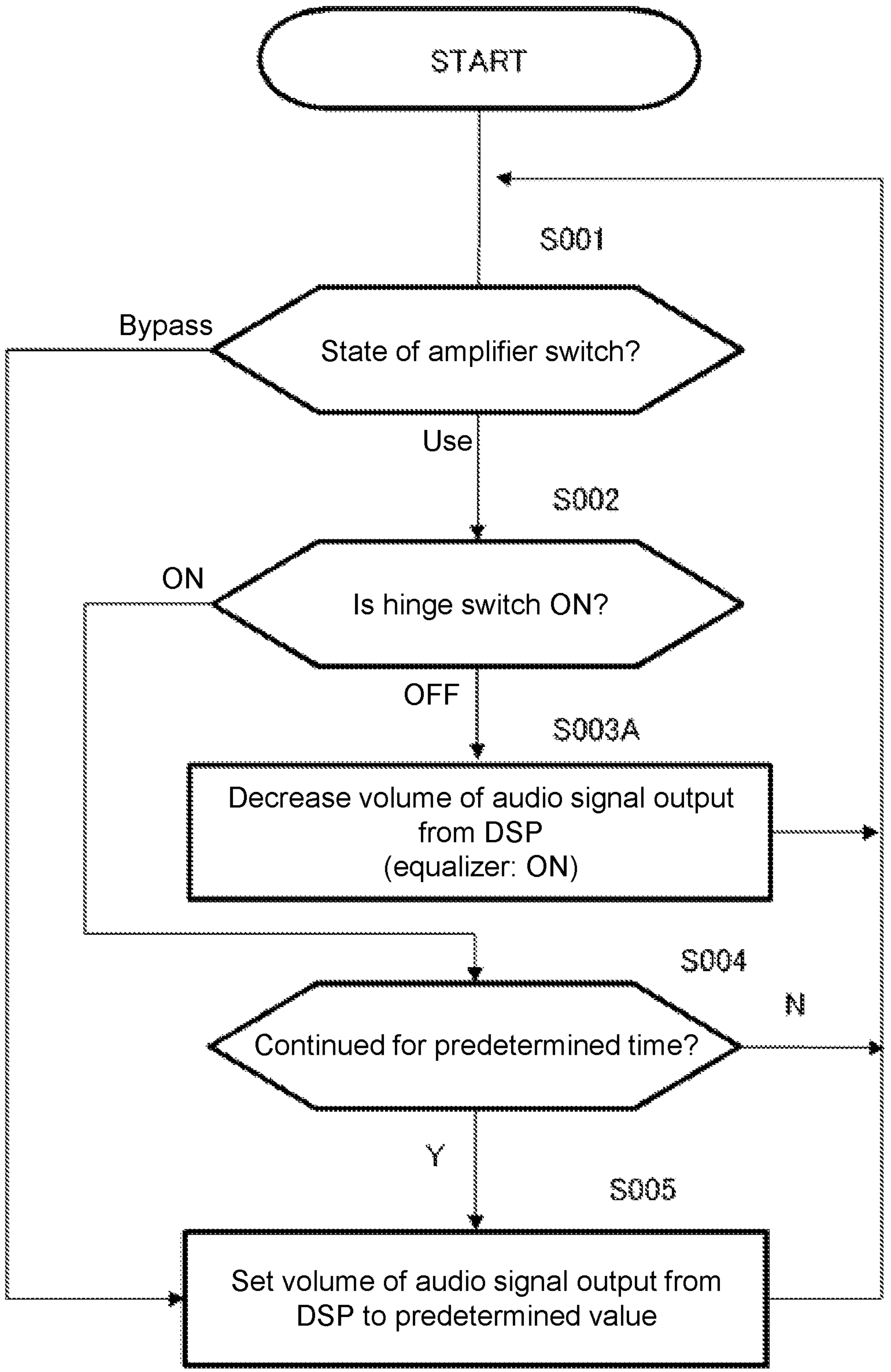
FIG. 5 is an explanatory diagram of Processing Example 2 of a controller.

FIG. 5 is an explanatory diagram of Processing Example 2 of the controller 31. In Processing Example 2, in the sound emitted from the speakers 15L and 15R of the headphone 10 in the speaker form, a decrease in a bass frequency band (for example, frequency band of 800 Hz or less) tends to be large. Processing Example 2 solves such a problem.

In FIG. 5, except for step S003A, the processing of steps S001 to S002, S004 and S005 is the same as that of Processing Example 1, and thus the description thereof will be omitted. In step S003A, the DSP 22 performs, in addition to volume adjustment that decreases the volume as in Processing Example 1, processing for improving sound quality in a low range. For example, the DSP 22 is provided with an equalizer. In the speaker form, the equalizer is inserted into a path of an audio signal in the DSP 22, and processing for increasing the volume in the bass frequency band is performed. In this way, while the DSP 22 decreases the volume of the audio signal as the volume adjuster, the equalizer of the DSP 22 as a sound quality adjuster performs sound quality adjustment (equalizing) that increases the volume in the bass frequency band. Accordingly, the low range of the sound emitted from the headphone 10 in the speaker form can be corrected. The sound quality adjuster like this and the configuration of Processing Example 2 are optional.

Figure 6:
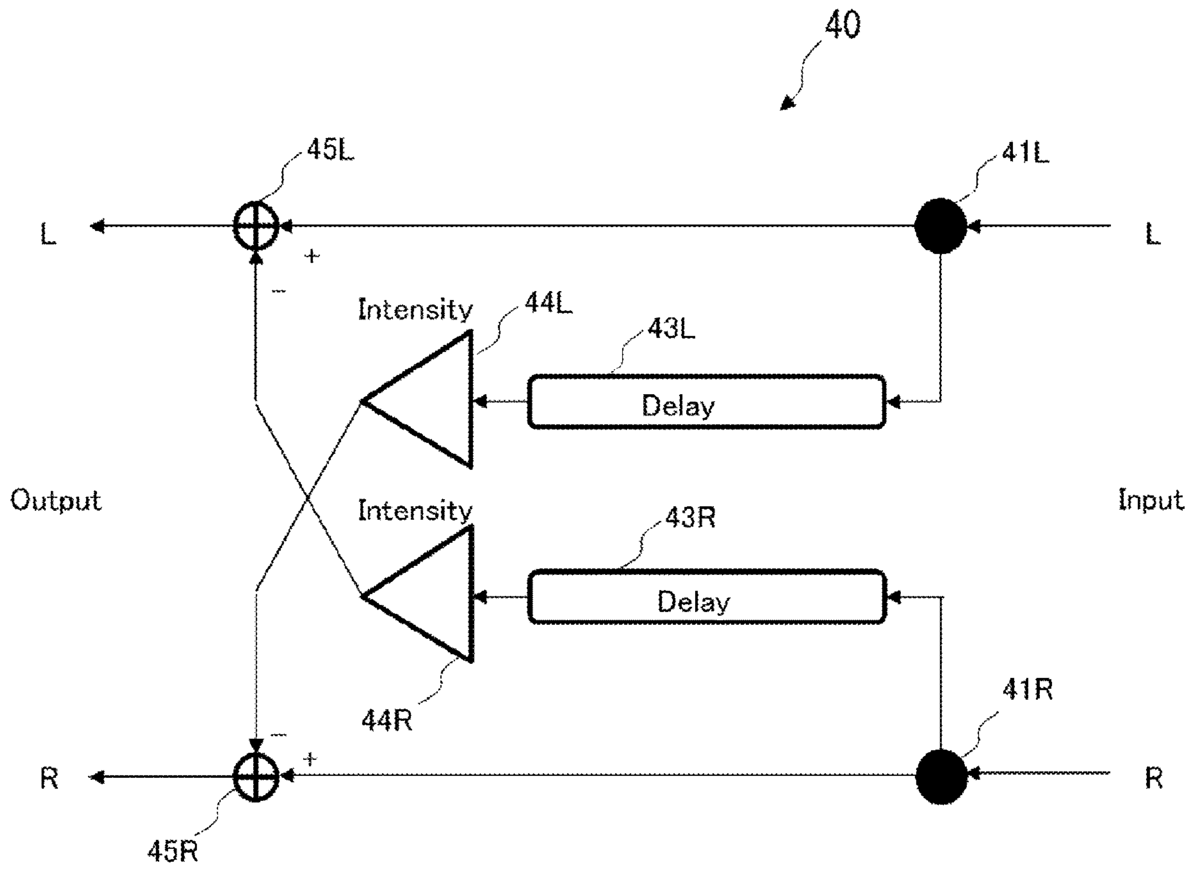
FIG. 6 is an explanatory diagram of a stereo enhancer.

Since a suitable sound image localization of a sound to be emitted differs between the headphone form and the speaker form of the headphone 10, the following configuration may be adopted. That is, the DSP 22 may be provided with a stereo enhancer 40 as shown in FIG. 6. In the speaker form, the stereo enhancer may be inserted into a path of an audio signal in the DSP 22.

In FIG. 6, the left and right audio signals are input to the stereo enhancer 40. The left and right audio signals branch at a junction 41L (41R) into a path toward an adder 45L (45R) and a path toward a delay circuit 43L (43R). The delay circuit 43L (43R) delays the audio signal and then inputs it to an inverting amplifier 44L (44R). The inverting amplifier 44L (44R) inverts the phase of the input audio signal, amplifies the audio signal, and inputs it to the adder 45R (45L). The adder 45L (45R) adds the left audio signal and a signal from the inverting amplifier 44R (44L). Accordingly, in the left and right audio signals output from the stereo enhancer 40, since the sound output from the speaker on the opposite side is decreased, a stereo feeling can be enhanced.

Figure 7:
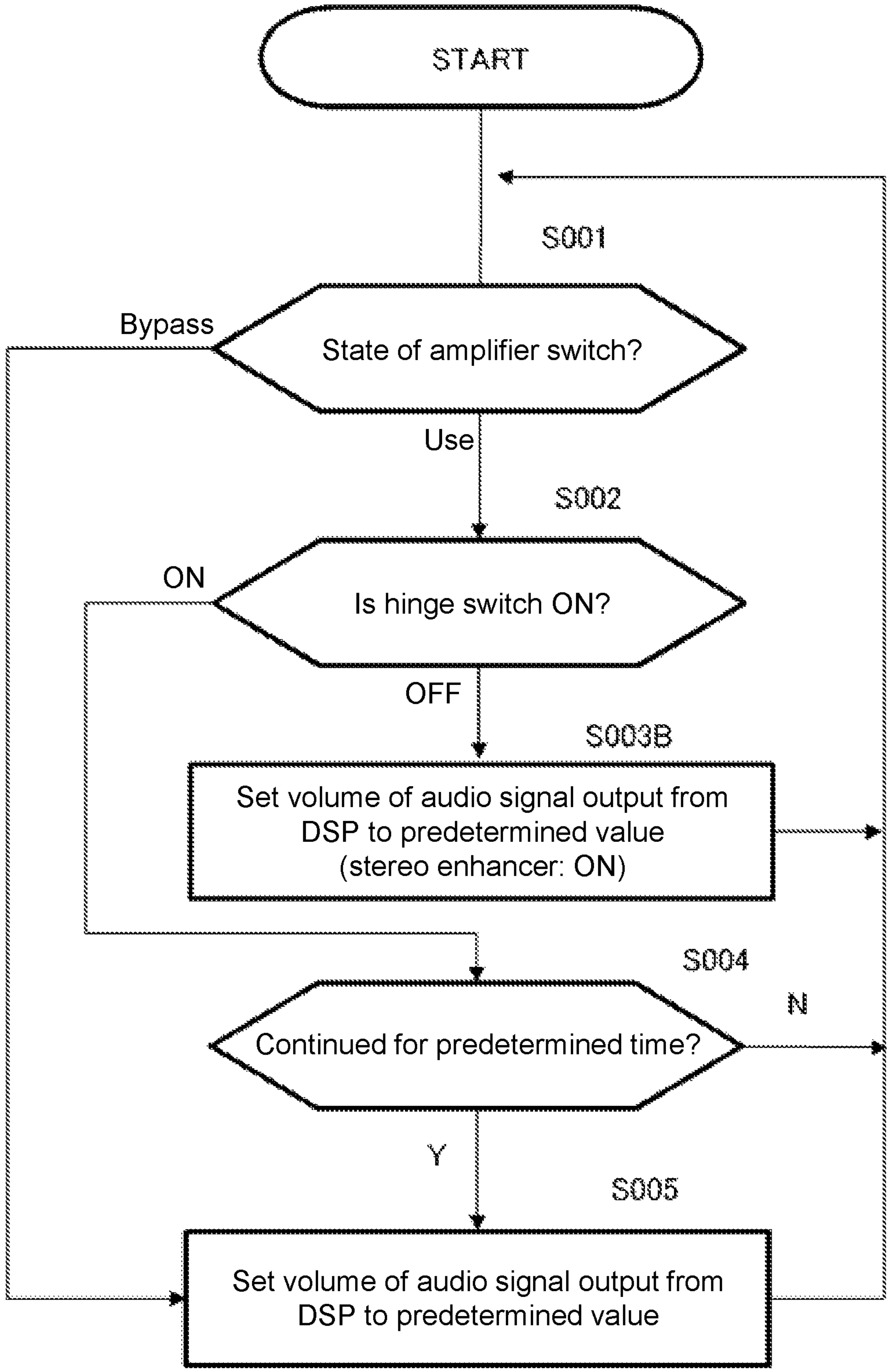
FIG. 7 is an explanatory diagram of Processing Example 3 of a controller.

FIG. 7 shows Processing Example 3 of the controller 31. In FIG. 7, except for step S003B, the processing of steps S001 to S002, S004 and S005 is the same as that of Processing Example 1, and thus the description thereof will be omitted. In step S003B, the DSP 22 performs, in addition to volume adjustment that decreases the volume as in Processing Example 1, conversion of an audio signal to stereo (stereo enhancement) using the stereo enhancer 40. In this way, while decreasing the volume of the audio signal as the volume adjuster, the DSP 22 performs stereo enhancement on the audio signal as the stereo enhancer 40. Accordingly, the stereo feeling of the sound emitted from the headphone 10 in the speaker form can be enhanced, and suitable sound can be output. The stereo enhancer 40 like this and the configuration of Processing Example 3 are optional.

The processing performed by the DSP 22 may be executed using hardware or a processor other than DSP, such as a dedicated or general-purpose integrated circuit.

The headphone 10 according to an embodiment includes the left and right ear cups 12L and 12R, the connection part 11 connecting the ear cups 12L and 12R, and the left and right hinges 13L and 13R provided in the connection part 11 and rotating the ear cups 12L and 12R respectively. The headphone 10 includes the left and right speakers 15L and 15R provided in the ear cups 12L and 12R, and the hinge switches 32L and 32R (first switch). The hinge switches 32L and 32R are switched off in the first form (headphone form) in which the left and right speakers 15L and 15R face each other, and are switched on in the second form (speaker form) in which the left and right speakers 15L and 15R are directed in the predetermined direction by rotation of the ear cups 12L and 12R. Further, the headphone 10 includes the left and right amplifiers 24L and 24R, and the amplifier switch 33 (second switch). The amplifiers 24L and 24R are respectively connected to the left and right speakers 15L and 15R and are able to amplify the left and right audio signals. The amplifier switch 33 selects one of the first path passing through the left and right amplifiers 24L and 24R and the second path bypassing the left and right amplifiers 24L and 24R as a path of the left and right audio signals. The headphone 10 includes the volume adjuster (DSP 22) that decreases the volume of the left and right audio signals input to the amplifiers 24L and 24R in the first state in which the first path is selected by the amplifier switch 33 and at least one of the hinge switches 32L and 32R is off to be less than the volume in the second state in which the first path is selected and both the hinge switches 32L and 32R are on. The position of the volume adjuster can be set as appropriate. However, as in the present embodiment, the volume adjuster is preferably provided in a stage preceding the amplifiers 24L and 24R so as to adjust the volume of an audio signal in digital form.

The following configuration may be adopted for the volume adjuster. The magnitude of the audio signal output from the DSP 22 to the DAC 23 is fixed. On the other hand, a variable resistor is connected to an input terminal of each of the amplifiers 24L and 24R connected to an output terminal of the DAC 23. The controller 31 is able to increase or decrease the volume of the audio signal input to the amplifiers 24L and 24R by controlling a resistance value of each variable resistor.

According to the headphone 10, in the case where the headphone 10 changes to the speaker form (second form), and the hinge switches 32L and 32R are off while the amplifier switch 33 is in the "use" state, the volume of the audio signal input to the amplifiers 24L and 24R is decreased. Accordingly, the volume of the headphone 10 in the speaker form can be suitably adjusted. That is, it can be prevented that the user may hear a sound of the headphone 10 having the volume in the speaker form near their ear.

In the headphone 10, in the case where the DSP 22 operating as the volume adjuster continues the first state for the predetermined time, the controller 31 may control the operation of the DSP 22 so as to decrease the volume of the left and right audio signals.

If the second path is selected by the amplifier switch 33, the volume adjuster (DSP 22) may adjust the volume of the left and right audio signals to be greater than the volume in the first state. Accordingly, unnecessary volume decrease during use of the amplifiers 24L and 24R can be avoided.

The DSP 22 operating as the volume adjuster may perform the following in the case of decreasing the volume of the left and right audio signals. That is, the DSP 22 increases the volume with the first slope during a period from the start time (t0) of volume decrease to the first time (t1). The DSP 22 decreases the volume with the second slope greater than the first slope during the period from the first time (t1) to the second time (t2). Then, the DSP 22 increases the volume with the third slope smaller than the second slope during the period from the second time (t2) to the ending time (t3) of volume decrease. By doing so, a volume change that is more friendly to the user's ear than a sudden volume change is made possible.

In the case where the DSP 22 operating as the volume adjuster transitions from the second state to the first state, the volume of the left and right audio signals may be increased. Accordingly, the volume can be suitably increased at the time of transformation from the headphone form to the speaker form.

The DSP 22 that increases the volume as the volume adjuster may operate as follows. That is, the DSP 22 increases the volume with the first slope during the period from the start time (t0) of volume increase of the left and right audio signals to the first time (t1). The DSP 22 increases the volume with the second slope greater than the first slope during the period from the first time (t1) to the second time (t2). Then, the DSP 22 increases the volume with the third slope smaller than the second slope during the period from the second time (t2) to the ending time (t3) of volume increase of the left and right audio signals.

In the case of decreasing the volume of the left and right audio signals, the headphone 10 may further include the sound quality adjuster (equalizer) that increases the volume in the bass frequency band. The equalizer can be provided in the DSP 22 as in the present embodiment. By providing the sound quality adjuster, bass sound in the speaker form can be corrected and suitable sound can be emitted.

In the case of decreasing the volume of the left and right audio signals, the headphone 10 may further include the stereo enhancer 40 that converts the left and right audio signals to stereo (stereo enhancement). The stereo enhancer 40 can be provided in the DSP 22 as in the present embodiment. By providing the stereo enhancer, it is possible to emit suitable sound in the speaker form. The configurations shown in the embodiments can be combined as appropriate without departing from the scope of the disclosure.

What is claimed is:

1. A headphone, comprising:

left and right speakers, connected by a connection part;

a first switch, switched off in a first form in which at least one of the left and right speakers is directed in an inward direction, and switched on in a second form in which both the left and right speakers are directed in a predetermined direction other than the inward direction;

left and right amplifiers, amplifying left and right audio signals input thereto and connecting the left and right audio signals respectively to the left and right speakers;

a second switch, selecting one of a first path and a second path as a path of the left and right audio signals, the first path passing through the left and right amplifiers, the second path passing through the left and right amplifiers and being amplified with an amplification factor smaller than that of the first path; and a volume adjuster, provided in a stage preceding the left and right amplifiers, wherein the volume adjuster decreases volume of the left and right audio signals input to the left and right amplifiers in a first state in which the first path is selected by the second switch and the first switch is off to be less than the volume of the left and right audio signals input to the left and right amplifiers in a second state in which the first path is selected and the first switch is on, wherein the volume adjuster decreases the volume of the left and right audio signals in response to the first state continuing for a predetermined time.

2. The headphone according to claim 1, wherein the volume adjuster adjusts the volume of the left and right audio signals in digital form.

3. The headphone according to claim 1, wherein the volume adjuster increases the volume of the left and right audio signals in response to a transition from the first state to the second state.

4. A headphone, comprising:

left and right speakers, connected by a connection part;

a first switch, switched off in a first form in which at least one of the left and right speakers is directed in an inward direction, and switched on in a second form in which both the left and right speakers are directed in a predetermined direction other than the inward direction;

left and right amplifiers, amplifying left and right audio signals input thereto and connecting the left and right audio signals respectively to the left and right speakers;

a second switch, selecting one of a first path and a second path as a path of the left and right audio signals, the first path passing through the left and right amplifiers, the second path passing through the left and right amplifiers and being amplified with an amplification factor smaller than that of the first path; and a volume adjuster, provided in a stage preceding the left and right amplifiers, wherein the volume adjuster decreases volume of the left and right audio signals input to the left and right amplifiers in a first state in which the first path is selected by the second switch and the first switch is off to be less than the volume of the left and right audio signals input to the left and right amplifiers in a second state in which the first path is selected and the first switch is on, wherein the volume adjuster adjusts the volume of the left and right audio signals to be greater than the volume in the first state in response to the second state continuing for a predetermined time.

5. The headphone according to claim 1, wherein the volume adjuster adjusts the volume of the left and right audio signals to be greater than the volume in the first state in response to the second path being selected by the second switch.

6. The headphone according to claim 1, wherein in a case of decreasing the volume of the left and right audio signals, the volume adjuster decreases the volume with a first slope during a period from a start time of volume decrease to a first time, decreases the volume with a second slope greater than the first slope during a period from the first time to a second time, and decreases the volume with a third slope smaller than the second slope during a period from the second time to an ending time of volume decrease.

7. The headphone according to claim 1, wherein the volume adjuster increases the volume with a first slope during a period from a start time of volume increase of the left and right audio signals to a first time, increases the volume with a second slope greater than the first slope during a period from the first time to a second time, and increases the volume with a third slope smaller than the second slope during a period from the second time to an ending time of volume increase of the left and right audio signals.

8. The headphone according to claim 1, further comprising:

a sound quality adjuster, increasing the volume in a bass frequency band in a case of decreasing the volume of the left and right audio signals.

9. The headphone according to claim 1, further comprising:

a stereo enhancer, converting the left and right audio signals to stereo in a case of decreasing the volume of the left and right audio signals.

10. A headphone, comprising:

left and right speakers, connected by a connection part;

a first switch, switched off in a first form in which the left and right speakers are directed in a predetermined direction, and switched on in a second form in which the left and right speakers are directed in a direction different from that in the first form;

left and right amplifiers, amplifying left and right audio signals input thereto and connecting the left and right audio signals respectively to the left and right speakers;

a second switch, selecting one of a first path and a second path as a path of the left and right audio signals, the first path passing through the left and right amplifiers, the second path passing through the left and right amplifiers and being amplified with an amplification factor smaller than that of the first path; and a volume adjuster, provided in a stage preceding the left and right amplifiers, wherein the volume adjuster decreases volume of the left and right audio signals input to the left and right amplifiers in a first state in which the first path is selected by the second switch and the first switch is off to be less than the volume of the left and right audio signals input to the left and right amplifiers in a second state in which the first path is selected and the first switch is on, wherein the volume adjuster decreases the volume of the left and right audio signals in response to the first state continuing for a predetermined time.

11. A volume adjustment method of a headphone, the headphone comprising left and right speakers connected by a connection part and left and right amplifiers amplifying left and right audio signals input thereto and connecting the left and right audio signals respectively to the left and right speakers, wherein the volume adjustment method comprises:

determining whether a first state is reached in which a first switch is off and a first path passing through the left and right amplifiers is selected by a second switch, wherein the first switch is switched off in a first form in which at least one of the left and right speakers is directed in an inward direction, and is switched on in a second form in which both the left and right speakers are directed in a predetermined direction other than the inward direction, and the second switch selects one of the first path and a second path passing through the left and right amplifiers and being amplified with an amplification factor smaller than that of the first path as a path of the left and right audio signals;

decreasing volume of the left and right audio signals input to the left and right amplifiers in the first state to be less than the volume of the left and right audio signals input to the left and right amplifiers in a second state in which the first path is selected and the first switch is on; and decreasing the volume of the left and right audio signals in response to the first state continuing for a predetermined time.

12. The volume adjustment method of a headphone according to claim 11, comprising:

adjusting the volume of the left and right audio signals in digital form.

13. The volume adjustment method of a headphone according to claim 11, comprising:

increasing the volume of the left and right audio signals in response to a transition from the first state to the second state.

14. The volume adjustment method of a headphone according to claim 11, comprising:

adjusting the volume of the left and right audio signals to be greater than the volume in the first state in response to the second path being selected by the second switch.

15. The volume adjustment method of a headphone according to claim 11, comprising:

in a case of decreasing the volume of the left and right audio signals, decreasing the volume with a first slope during a period from a start time of volume decrease to a first time, decreasing the volume with a second slope greater than the first slope during a period from the first time to a second time, and decreasing the volume with a third slope smaller than the second slope during a period from the second time to an ending time of volume decrease.

16. The volume adjustment method of a headphone according to claim 11, comprising:

increasing the volume with a first slope during a period from a start time of volume increase of the left and right audio signals to a first time, increasing the volume with a second slope greater than the first slope during a period from the first time to a second time, and increasing the volume with a third slope smaller than the second slope during a period from the second time to an ending time of volume increase of the left and right audio signals.

17. A headphone, comprising:

left and right speakers, connected by a connection part;

a first switch, switched off in a first form in which the left and right speakers face each other, and switched on in a second form in which the left and right speakers are directed in a predetermined direction other than a direction in which the left and right speakers face each other;

left and right amplifiers, amplifying left and right audio signals input thereto and connecting the left and right audio signals respectively to the left and right speakers;

a second switch, selecting one of a first path and a second path as a path of the left and right audio signals, the first path passing through the left and right amplifiers, the second path bypassing the left and right amplifiers; and a volume adjuster, provided in a stage preceding the left and right amplifiers, wherein the volume adjuster decreases volume of the left and right audio signals input to the left and right amplifiers in a first state in which the first path is selected by the second switch and the first switch is off to be less than the volume of the left and right audio signals input to the left and right amplifiers in a second state in which the first path is selected and the first switch is on, wherein the volume adjuster decreases the volume of the left and right audio signals in response to the first state continuing for a predetermined time.

* * * * *